No. 717,798. PATENTED JAN. 6, 1903.
B. BEERWALD.
AMUSEMENT APPARATUS.
APPLICATION FILED JUNE 6, 1902.
NO MODEL. 4 SHEETS—SHEET 1.

WITNESSES: INVENTOR:
Walter C. Pusey. Benjamin Beerwald,
Walter A. Wyrill BY
Joshua Pusey.
ATTORNEY No. 717,798. PATENTED JAN. 6, 1903.
B. BEERWALD.
AMUSEMENT APPARATUS.
APPLICATION FILED JUNE 6, 1902.
NO MODEL. 4 SHEETS—SHEET 2.

WITNESSES:
Walter C. Pusey
Walter A. Thypill

INVENTOR:
Benjamin Beerwald,
BY Joshua Pusey,
ATTORNEY.

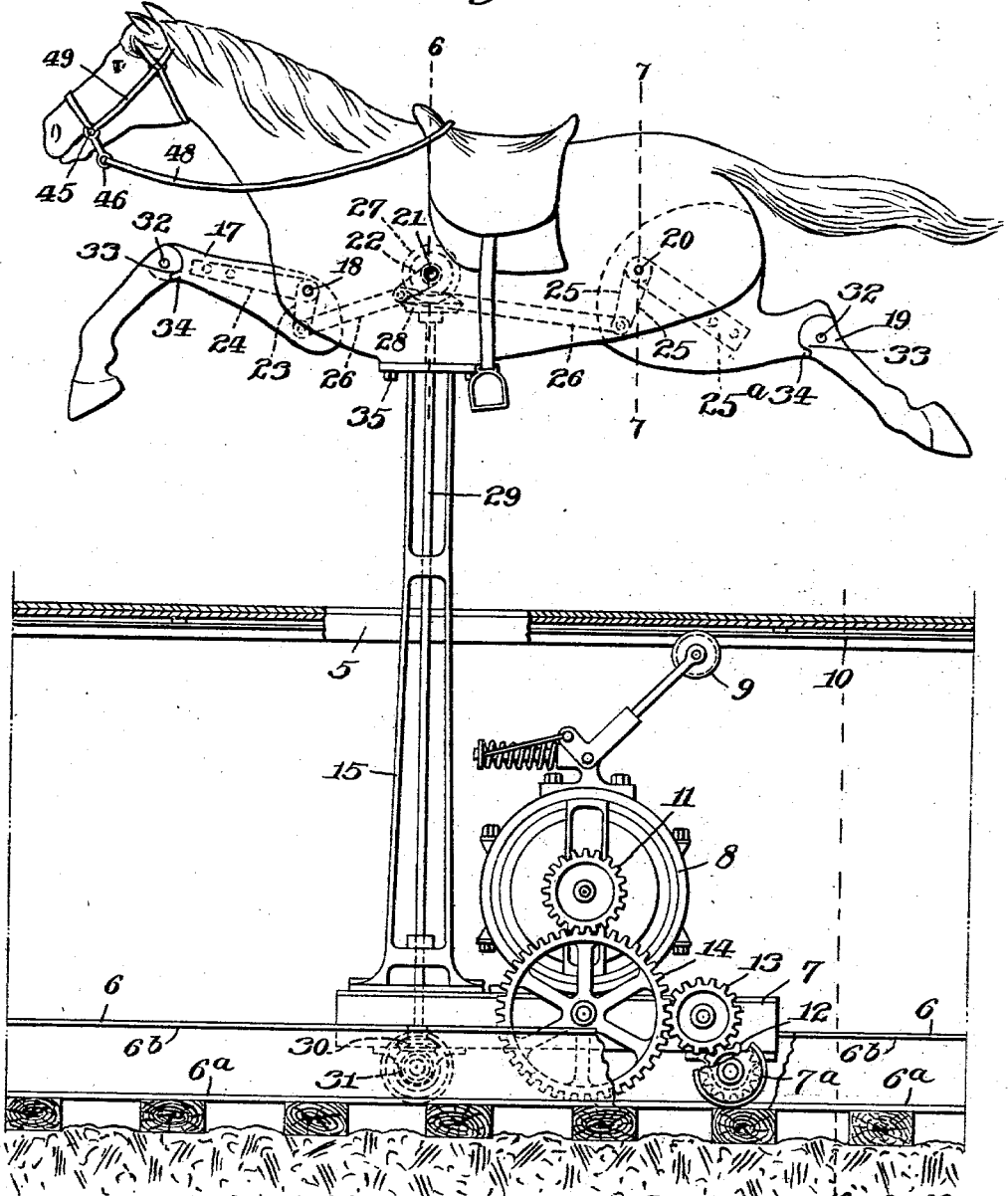

No. 717,798. PATENTED JAN. 6, 1903.
B. BEERWALD.
AMUSEMENT APPARATUS.
APPLICATION FILED JUNE 6, 1902.
NO MODEL. 4 SHEETS—SHEET 4.
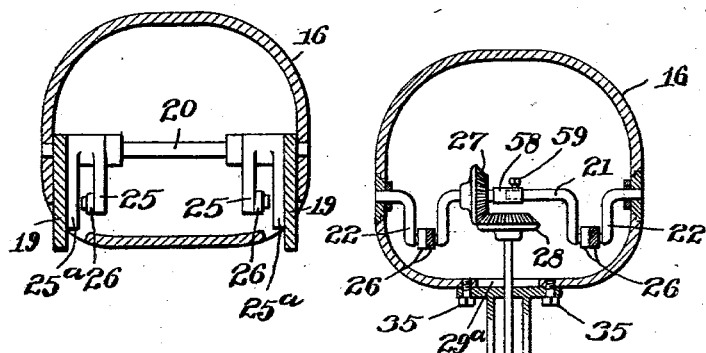
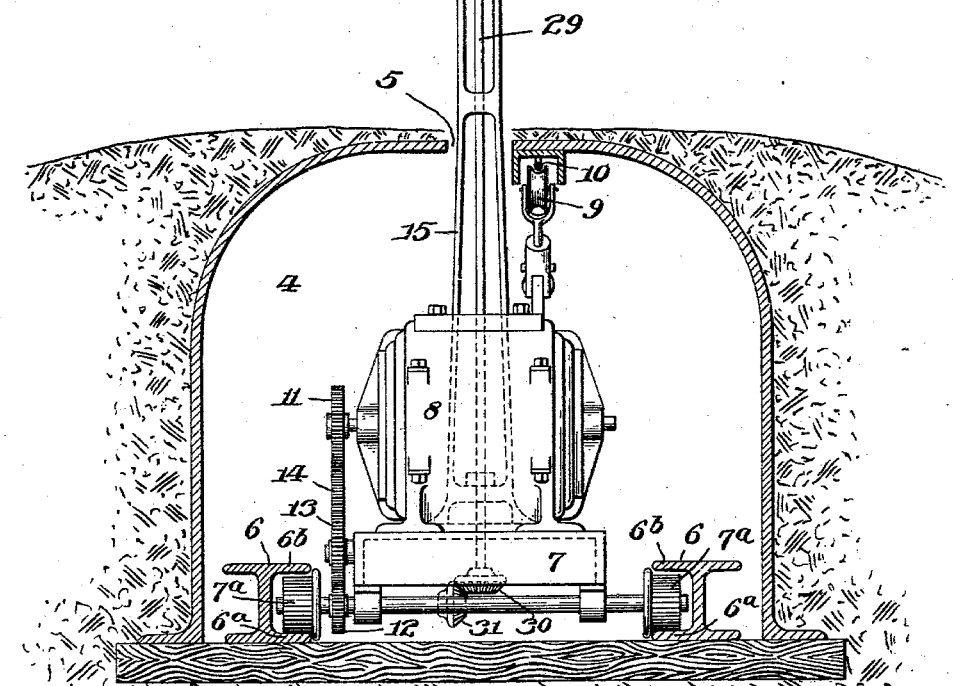
WITNESSES:
Walter C. Pusey
Walter A. Orgill
INVENTOR:
Benjamin Beerwald,
BY
Joshua Pusey,
ATTORNEY.

UNITED STATES PATENT OFFICE.

BENJAMIN BEERWALD, OF PHILADELPHIA, PENNSYLVANIA, ASSIGNOR OF ONE-HALF TO THOMAS J. RYAN, OF PHILADELPHIA, PENNSYLVANIA.

AMUSEMENT APPARATUS.

SPECIFICATION forming part of Letters Patent No. 717,798, dated January 6, 1903.

Application filed June 6, 1902. Serial No. 110,482. (No model.)

*To all whom it may concern:*

Be it known that I, BENJAMIN BEERWALD, a citizen of the United States, residing in the city and county of Philadelphia, in the State of Pennsylvania, have invented certain new and useful Improvements in Amusement Apparatus, of which the following is a full, clear, and exact description, reference being had to the accompanying drawings, of which—

Figure 1:
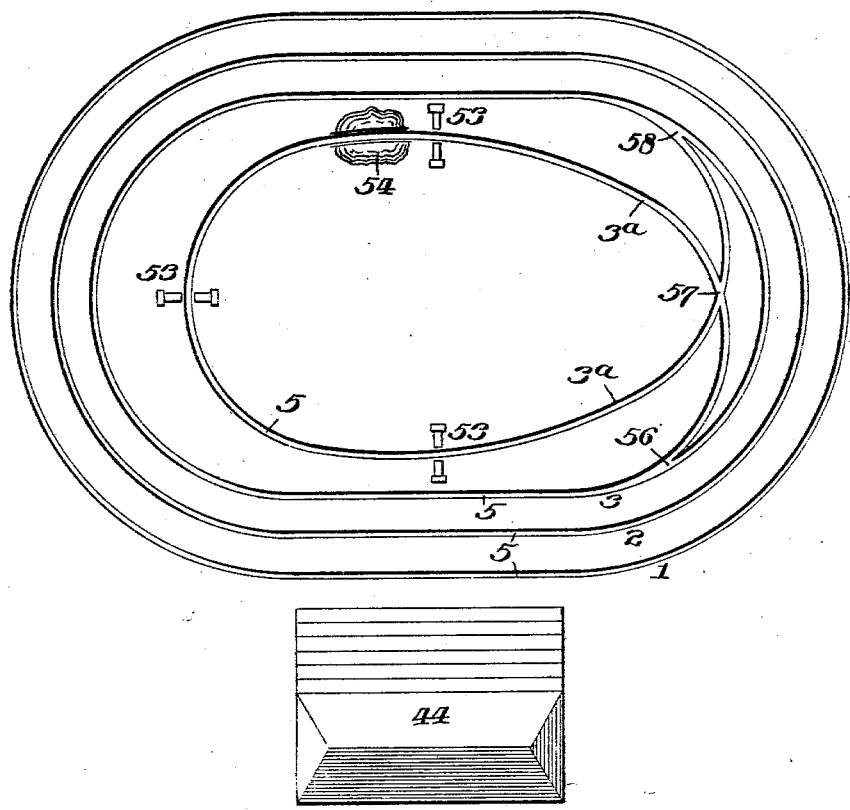
Figure 2:
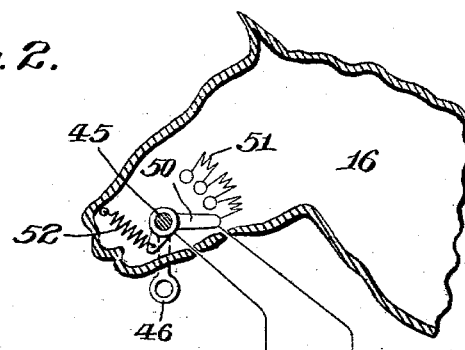
Figure 3:
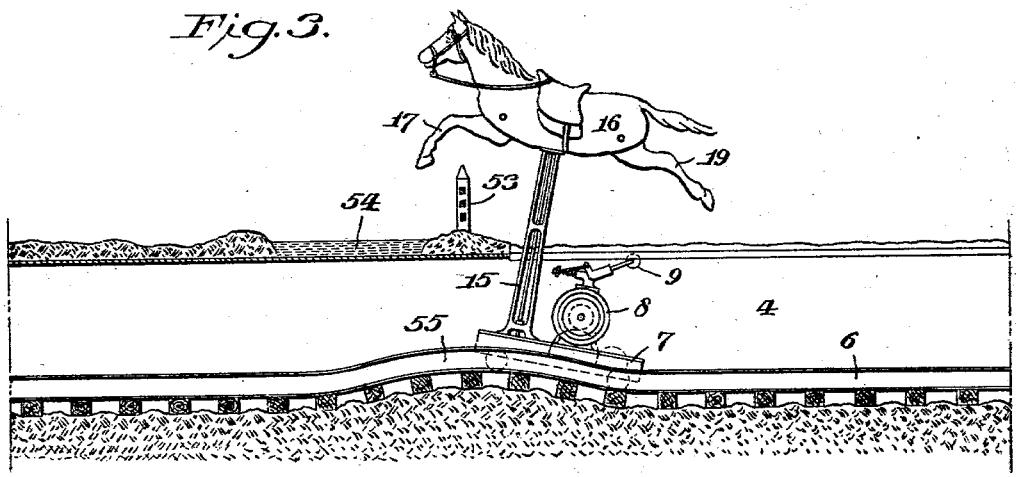
Figure 4:
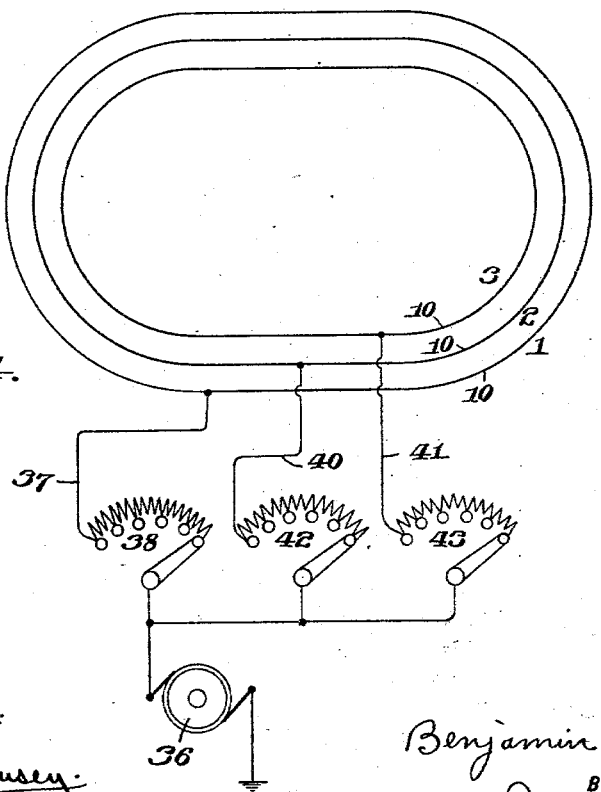

Figure 1, Sheet 1, is a plan view. Fig. 2 is a detail illustrating diagrammatically means whereby the rider upon an animal form may vary the speed of movement of said form. Fig. 3 is a longitudinal vertical section through a portion of the underground conduit, showing also the means whereby the animal form is caused to apparently leap over a hurdle. Fig. 4 is a diagrammatic plan illustrating the means for varying the speed of the animal form at a distance from the course. Fig. 5 is a longitudinal vertical section through the conduit, showing in side elevation the trackway, the truck and trolley-motor, and the animal form carried by said truck. Fig. 6 is a section as on line 6 6, Fig. 5. Fig. 7 is a section as on line 7 7, Fig. 5.

The main object of this invention is to provide an amusement apparatus in the nature of what may be termed an "artificial race-course," wherein bodies of the form of horses or other animals upon which persons may be seated are caused to travel along such course by means of a subterranean power-propelled mechanism.

A leading feature of the invention comprises an underground conduit having a longitudinal slot, a trackway within said conduit, a truck adapted to travel on said trackway, and a body shaped like an animal which is supported above said conduit and above the level of the ground by a standard secured to said truck and extending up through the said slot in the conduit, the upper end of the standard being secured to the belly of the animal, together with means for propelling the truck along the trackway, as hereinafter described.

A second feature of the invention comprises, in combination with the foregoing specified parts or elements, the said body or animal form, with limbs or other members pivoted or joined to the body portion and mechanism for imparting motion to said limbs or members by the movement of the truck upon the trackway.

A third feature of the invention relates to means whereby when desired the speed of movement of the truck, and consequently that of the animal form or the like, may be controlled and varied from a point at any desired distance from the course.

A fourth feature of the invention comprises, in connection with means for controlling the speed of the truck at a distance, means whereby the rider of the animal form, or the like may vary the speed of the truck, and consequently of the animal form, but subject to said control from a distance.

A fifth feature of the invention relates to the combination, with said trackway, of hurdles or hedges or the like placed transversely to the trackway and means for causing the animal form to appear to leap over said hurdles, &c.

Other features of the invention relate to various combinations and details of construction, which will hereinafter be duly pointed out.

Referring to the accompanying drawings, forming a part of this specification, in which drawings I have shown the invention in that form and construction which I at the present time consider the most desirable, 1, 2, and 3, Fig. 1, denote, respectively, outer, middle, and inner courses along which the animal forms are intended to travel. In the present instance these courses are a regular oval, as shown; but they may be of many other forms, as fancy may dictate. Each course consists of an underground conduit 4, Figs. 3, 5, and 6, having a narrow longitudinal slot or passage-way 5 at the top. Within the conduit is laid a trackway composed of two rails 6, that for a purpose hereinafter mentioned are preferably of a particular form. (Shown in the drawings.)

7 is a truck whose four wheels are adapted to run upon said trackway. Mounted on this truck is a motor 8, that is driven from a source of electrical energy. The motor-frame supports a spring-controlled trolley-pole, with a trolley-wheel 9, that bears against a conductor-wire 10, that extends the length of the conduit and trackway and is suitably suspended from the under side of the upper part of the conduit. The motor is adapted to propel the truck upon the trackway through a train of gears, consisting of a gear 11 on the motor-shaft, a gear 12 on the rear axle of the truck, and intervening gears 13 and 14, journaled to said truck. Secured firmly to and rising from the forward end of the latter is a standard 15, that extends up through the slot 5, and upon the upper end of the standard is an animal figure 16, whose belly portion is fastened to said standard, and which figure is preferably in the form of a horse, as shown.

In order to give to the animal form an approximately life-like appearance when in motion, I form the same as in the attitude of running, and in order to further imitate a running action I make parts thereof, such as the legs, movable upon the body of the animal in the following manner: I make both the fore legs 17 separate from the body and pivot the same to a shaft 18, (indicated by dotted lines in Fig. 5,) that is secured to and extends transversely through the body of the animal. I also make the hind legs 19 separate from the body and in like manner pivot the same to a shaft 20, that is secured to said body. I also journal within the body portion and about midway thereof a transverse shaft 21, having two cranks 22, one at each end, as seen in Fig. 6. Pivoted on the shaft 18 is an arm 23, there being one on each side of the interior of the animal, from which arm extends forward an arm 24, to which the fore leg 17 is secured. The shaft 20 has in like manner pivoted thereon an arm 25, having a rearwardly-extending arm 25$^a$, that is fastened to the hind leg 19. Rods 26 connect the arms 23 and 25, respectively, with the cranks 22 of shaft 21. The latter shaft carries a bevel-gear 27, that engages a similar gear 28 on the upper end of a vertical shaft 29, that is supported by and is journaled in suitable bearings of the aforesaid standard 15. On the lower end of this shaft is a bevel-gear 30, that engages a like gear 31 on the front axle of the truck 7.

It will be readily understood that through the mechanism just described when the truck is put in motion on the trackway a vibratory movement will be imparted to the limbs of the animal, imitating or approximating the natural movement thereof in running. By suitably arranged and timed mechanisms the character and extent of the movement of the limbs of the animal figure may be varied as may be desired or the kind of animal may require. For example, the movements of an elephant, a camel, and a giraffe would differ from each other and from those of a horse.

In order to further simulate the natural action of the animal in running, I sometimes pivot the lower or fore part of the legs to the upper part at 32, Fig. 5—that is, at a point corresponding with the knee-joint of the animal—and to prevent the said lower part from normally dangling from its pivot I provide the same with an offset 33, that stops against a projection 34 of said upper part of the leg, and thus while maintaining said lower part normally in the approximately natural position (shown in Fig. 5) permits the part to otherwise swing freely on its pivot, when the legs are vibrated downwardly through the before-described mechanism that is driven from the truck-shaft.

It may sometimes be desirable to remove a figure from the standard 15 and substitute therefor another figure. To this end, reference being had to Figs. 5 and 6, I fasten the figure detachably, as by bolts 35, to the top of the said standard, and I make the opening 29$^a$ in the belly of the figure, through which the shaft 29 passes, of larger diameter than that of the gear 28 on said shaft. By unscrewing said bolts the figure may be lifted from the standard, the gear 28 passing through the said opening, whereupon, if desired, another figure having a gear similar to 27 and having also a crank-shaft 21 may be substituted for the one removed.

The means which I employ to control and vary from a distance the speed of travel of the trucks or truck upon the trackway, and consequently the speed of the animal figures, are as follows, reference being had to the diagrammatic view Fig. 4, in which 10 designates the several trolley-wires that are within the respective conduits, as hereinbefore described: When but a single course is used—as, say, the outer one 1 in the drawings—I connect the trolley-wire 10 of that course with the generator 36 by a conductor-wire 37, and I interpose in the circuit a suitable rheostat 38, whereby the voltage may be increased or diminished, thus correspondingly affecting the speed of the motor 8, and consequently that of the truck or trucks. When, as in the present instance, there are two or more other courses, I connect the additional trolley-wires 10 thereof, respectively, with the generator 36 by conductor-wires 40 and 41, respectively, and I interpose rheostats 42 and 43 in the circuits, as indicated in Fig. 4. I would usually locate the said rheostats at a grand stand 44, Fig. 1, adjacent to the course, where they may be conveniently operated when desired without being observed by the spectators.

In order to further enhance the amusement afforded by my invention, I provide the following means whereby the rider of the figure of the horse or other animal may vary the speed of its movement, subject, however, to the said control from a distance. In the head of the animal I journal a transverse shaft 45, that is located at a point corresponding with the bit. To the outer free ends, respectively, of this shaft are secured depending arms 46, whose outer ends are connected with the reins 48 of a bridle 49, secured to the head of the animal, as seen in Figs. 3 and 5. Secured to said shaft 45 within the head of the animal is an arm 50, which constitutes the switch-arm of a rheostat 51, that is interposed in the circuit of the motor 8, as indicated diagrammatically in Fig. 2. To diminish the speed of the animal, the rider mounted thereon draws upon the reins 48, thus in the present instance causing the arm 50 to swing upwardly, thereby diminishing the voltage through the motor, and consquently checking the speed of the truck. The said arms 50 and 46 may be allowed to swing back by gravity or, preferably, are drawn back by a spring 52 when the rider loosens the reins.

I sometimes further render my artificial race-course entertaining by making the surface of the earth thereabout to resemble ground for a "steeplechase," and I place across the course one or more apparent obstructions—such as hurdles, hedges, or other elevated objects—to be ostensibly leaped over by the horse figures 16, and I also sometimes provide a body or bodies of water over which said figures will appear to jump or leap, as hereinafter described.

In Fig. 1 I have shown, in connection with a continuation or branch, which will be hereinafter referred to, of the inner one 3 of the three courses, three hurdles (marked 53) and a pond of water, (marked 54.) One of the hurdles is shown in elevation in Fig. 3, the same having a slot or opening to allow the passage of the standard 15. The conduit-trackway 6 is arched upwardly adjacent to the vertical plane of the hurdle, as seen at 55 in Fig. 3—that is to say, it ascends to said plane or thereabout and then descends. As the truck passes up and over this arched portion of the trackway the horse figure carried thereby will be caused to rise, as seen in Fig. 3, and then pass over the hurdle—that is to say, the animal will clear the latter.

It will be obvious that within limits the movements of the animal in a vertical plane may be varied by varying the curve or curves of the trackway according to the particular kind of movement desired.

The pond 54, although designed to be, in effect, a continuous body of water, is, in fact, two separate bodies, one on each side of the slot 5, with a passage-way between them for the standard 15, as seen in Fig. 1.

I have shown in the drawings the pond and a hurdle adjacent to each other and the arch of the trackway of such length as to cause the animal to clear both hurdle and pond at a single leap.

Referring to the before-mentioned continuation or steeplechase branch course 3ᵃ of the course 3, with particular reference to Fig. 1, which shows in plan, the slots 5 of the several conduits—the conduit, its slot, and trackway branch off from the conduit, slot, and trackway of the course 3, at a point indicated by 56 in said figure—and the said conduit, &c., of course 3ᵃ cross themselves at a point indicated by 57, and connect with the slot, &c., of the course 3, at a point indicated by 58, in said figure.

When it is desired to run a truck from course 3 to branch course 3ᵃ, the truck traveling in the direction of the arrow, it is shunted from one to the other by means of a switch of usual construction (not shown) in the trackway.

It is desirable that the truck should not be liable to tilt forward or backward or sidewise, and in order to prevent such tilting I make the rails 6 with the usual foot-flanges 6ᵃ and also with a top flange 6ᵇ, that overhangs the latter, between which flanges I place the truck-wheels 7ᵃ, as shown in Figs. 3, 5, and 6.

In order to vary the movements of the legs of the animal on one side with relation to that of the legs on the opposite side, I make the crank-shaft 21 in two parts and connect the adjacent ends thereof by a coupling 58', that is fixed to one part of the shaft and loose upon the other. The latter is made fast to the coupling by means of a set-screw 59. By first loosening this screw the one part of the shaft may be rotated independently of the other, and thus the cranks 22 may be set in any plane with relation to each other.

I remark that the form and construction of my invention and of the various parts thereof may be considerably varied without departing from the principle of the invention. For example, the general and particular contour of the course or courses may be varied, other means and mechanisms than that herein described may be employed for propelling the trucks upon the trackway, and other mechanism may be used in lieu of that described for imparting independent movements from the truck to the jointed or pivoted limbs of the animal figures, and the particular character of such movements may be varied by correspondingly varying the mechanism connecting said limbs, with which mechanism the truck is connected. I further remark that in practice I would, besides making the ground about the course in imitation of natural ground or landscape, bring the animal forms as close to the ground as may be done, so as to imitate as closely as possible animals running upon a race-course or field or the like.

Having thus described my invention, I claim as new and desire to secure by Letters Patent—

1. In an apparatus of the character recited, the combination of the underground conduit, having the longitudinal slot, the trackway in said conduit, the truck adapted to travel on said trackway, means for propelling the truck, the standard carried by said truck extending up through said slot, an animal form mounted upon said standard, and having the legs pivoted to the body portion, the shaft within the latter, having the cranks, the gear on said shaft, the arms connected with said legs respectively, and with the cranks of said shaft, the vertical rotatable shaft journaled in said standard, the gear on the upper end of this shaft, the gear on said crank-shaft engaging the first-mentioned gear, together with the gear on the lower end of said vertical shaft and the gear on the truck-shaft with which the last-mentioned gear engages, substantially as and for the purpose set forth.

2. In an apparatus of the character recited, the combination with an underground conduit having a longitudinal slot, of a trackway in said conduit, a truck also arranged in said conduit and adapted to travel upon said track, a standard carried by said truck and extending up through said slot, an animal form mounted upon the upper end of said standard, an electric motor carried by the truck for propelling the latter, a source of current with which said motor is in circuit, means carried by the said animal form and actuated by the rider for positively controlling the speed of said motor, and controlling means located at a point remote from the conduit for also controlling the speed of the motor, the controlling means carried by the animal form being subordinate to the action of the controlling means located remote from the conduit.

3. In an apparatus of the character recited, the combination with an underground conduit having a longitudinal slot, of a trackway in said conduit, a truck also arranged in said conduit and adapted to travel upon said track, a standard carried by said truck and extending up through said slot, an animal form mounted upon the upper end of said standard, an electric motor carried by the truck for propelling the latter, a source of current with which said motor is in circuit, a resistance carried by the animal form and included in the motor-circuit, said resistance being actuated by the rider for positively controlling the speed of said motor, and a resistance also included in the motor-circuit and located at a point remote from the conduit for also controlling the speed of the motor, the resistance carried by the animal form being subordinate to the action of the resistance located remote from the conduit.

4. In an apparatus of the character recited, the combination of the underground conduit having the longitudinal slot, the trackway in said conduit, the truck adapted to travel on said trackway, means for propelling said truck, the standard carried by said truck, an animal form mounted on the upper end of said standard, and having the members pivoted to the body of said form, the vertical rotatable shaft journaled in said standard and extending into the interior of the animal form, the gear on the upper end of said shaft, the crank-shaft having the gear with which the first-mentioned gear is adapted to engage, the connections between the cranks of said crank-shaft and said pivoted members, the gear on the lower end of said vertical shaft, the gear on the truck with which the latter gear engages, means for detachably securing the said animal form to said standard and said vertical shaft, whereby an interchange of animal forms with said standard and said shaft may be had, substantially as and for the purpose set forth.

In testimony whereof I have hereunto affixed my signature this 26th day of May, A. D. 1902.

BENJAMIN BEERWALD.

Witnesses:
   JAMES H. BELL,
   WALTER C. PUSEY.